(12) United States Patent
Kirshenbaum et al.

(10) Patent No.: US 6,988,089 B2
(45) Date of Patent: Jan. 17, 2006

(54) DERIVING A GENOME REPRESENTATION FOR EVOLVING GRAPH STRUCTURE WEIGHTS

(75) Inventors: Evan Randy Kirshenbaum, Mountain View, CA (US); Kenneth O. Stanley, Austin, TX (US); Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 584 days.

(21) Appl. No.: 09/847,869

(22) Filed: May 2, 2001

(65) Prior Publication Data
US 2003/0033264 A1 Feb. 13, 2003

(51) Int. Cl.
*G06F 15/18* (2006.01)
(52) U.S. Cl. .......................................... 706/14; 706/13
(58) Field of Classification Search ................ 706/14, 706/13
See application file for complete search history.

(56) References Cited

PUBLICATIONS

Knowles et al, "A Comparison of Encodings and Algorithm for Multiobjective, Minimum Spanning Tree problems", IEEE proceedings of the 2001 Congress on Evolutionary Computation, May 2001.*

Hsieh et al, "Efficient parallel algorithms on Distance-Hereditary graphs", IEEE proceedings of the 1997 International Conference on parallel processing, Aug. 1997.*

* cited by examiner

*Primary Examiner*—Geprge Davis

(57) ABSTRACT

A method for deriving a genome representation for the weights in a graph structure that increases the likelihood that solutions to substructures of the graph structure will be preserved during crossover operations. The preservation of solutions to substructures across generations of organisms may decrease the computational time when evolving to a desired solution.

30 Claims, 3 Drawing Sheets

DERIVING A GENOME REPRESENTATION FOR EVOLVING GRAPH STRUCTURE WEIGHTS

BACKGROUND OF THE INVENTION

1. Field of Invention

The present invention pertains to the field of designing graph structures. More particularly, this invention relates to deriving a genome representation for evolving the weights in a graph structure.

2. Art Background

A variety of disciplines including computer science commonly express solutions to problems in the form of graph structures. For example, neural networks which are commonly used in computer-related applications may be expressed in the form of graph structures.

A graph structure typically includes a set of nodes and a set of arcs that provide interconnections among the nodes. Each arc of a graph structure usually has an associated weight. The design of a graph structure typically involves determining an appropriate arrangement of nodes and arcs and determining an appropriate weight for each arc.

One prior method for determining the weights in a graph structure is to use genetic programming techniques to evolve the weights. A typical genetic programming method involves generating an initial population of organisms each of which is a candidate solution for the weights, selecting a subset of organisms from the initial population for use as parents of a generation of child organisms, and generating the child organisms by combining genetic material from the parent organisms using genetic operators such as mutation and cross-over. Typically, many generations of child organisms are generated and tested before a suitable set of weights is found.

The genetic operators of mutation and crossover are usually applied to an arrangement of genetic material which is commonly referred to as a genome representation for the weights. It is usually desirable to employ a genome representation that will yield the most efficient evolution to a desired solution. For example, a reduction in the number of generations of organisms that are generated and evaluated usually decreases the time it takes to reach a desired solution and decreases the overall design cost of a graph structure.

SUMMARY OF THE INVENTION

A method is disclosed for deriving a genome representation for the weights in a graph structure that increases the likelihood that solutions to substructures of the graph structure will be preserved during crossover operations. The preservation of solutions to substructures across generations of organisms may decrease the time and costs associated with evolving a suitable set of weights.

A method for designing a graph structure according to the present teachings includes determining a genome representation for a set of weights for a set of arcs in the graph structure such that the arcs of the graph structure that participate in a substructure of the graph structure are in a close proximity in the genome representation. The graph structure may then be evolved using the genome representation.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
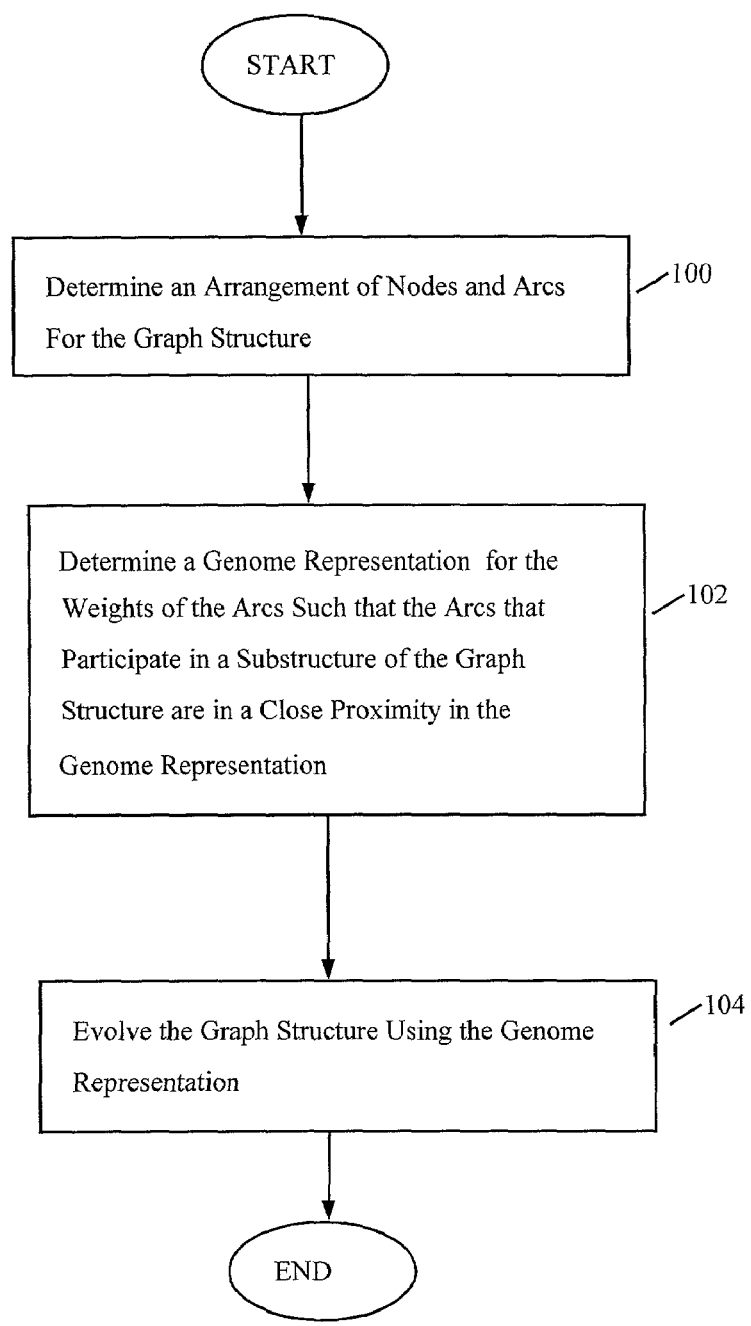
FIG. 1 shows a method for designing a graph structure which incorporates the present teachings.

FIG. 1 shows a method for designing a graph structure which incorporates the present teachings. At step 100, an arrangement of nodes and arcs for the graph structure is determined. Any one or more of a variety of known techniques are employed at step 100 including designs by hand and automated methods.

At step 102, a genome representation for the weights of the graph structure from step 100 is determined. The genome representation is determined at step 102 such that the arcs of the graph structure that participate in a substructure of the graph structure are in a close proximity in the genome representation. This arrangement for the genome representation increases the likelihood that the weights associated with a substructure will be preserved during the formation of a next generation of organisms using crossover.

At step 104, the graph structure is evolved using the genome representation obtained at step 102. Step 104 is performed using any one or more of a variety of known genetic programming techniques.

Figure 2A:
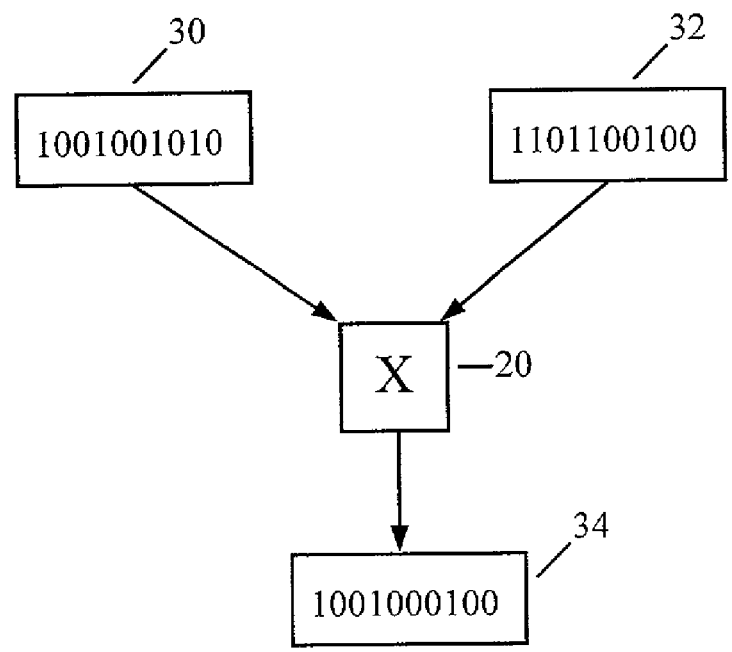
FIGS. 2a–2b illustrate crossover operations which are used to generate a child organism from a pair of parent organisms when evolving the graph structure.
Figure 2B:
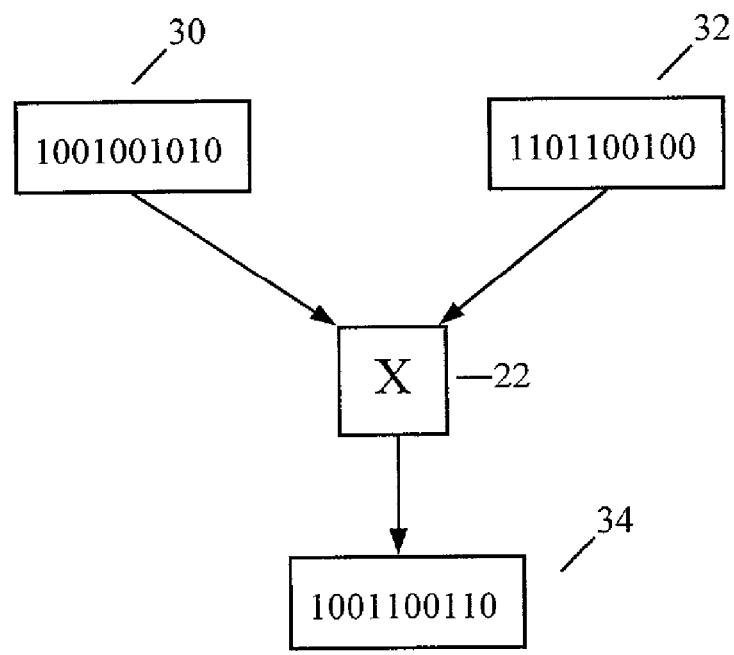

FIGS. 2a–2b illustrate crossover operations which are used at step 104 to generate a child organism from a pair of parent organisms when evolving the graph structure 200. In this example, the parent and child organism each have genetic material made up of a sequence of bits. Alternatively, the genetic material of an organism is a sequence of numbers.

FIG. 2a shows a one-point crossover operation 20 which combines a parent organism 30 with a parent organism 32 to yield a child organism 34. The one-point crossover operation 20 combines a sequence of genetic material 10010 from the parent organism 30 as a prefix with a sequence of genetic material 00100 from the parent organism 32 as a suffix to yield a sequence of genetic material 1001000100 in the child organism 34. The crossover point in this example is between the fifth locus and sixth locus of the sequence but in general may be located anywhere in the sequence. The locus of crossover is randomly chosen each time.

FIG. 2b shows a two-point crossover operation 22 which combines a sequence of genetic material 100 - - - 10 from the parent organism 30 with a sequence of genetic material 11001 from the parent organism 32 to yield a sequence of genetic material 1001100110 in the child organism 34. The crossover points in this example are between the third locus and fourth locus of the sequence and between the eighth locus and ninth locus of the sequence but in general are located at any two positions in the sequence.

Figure 3:
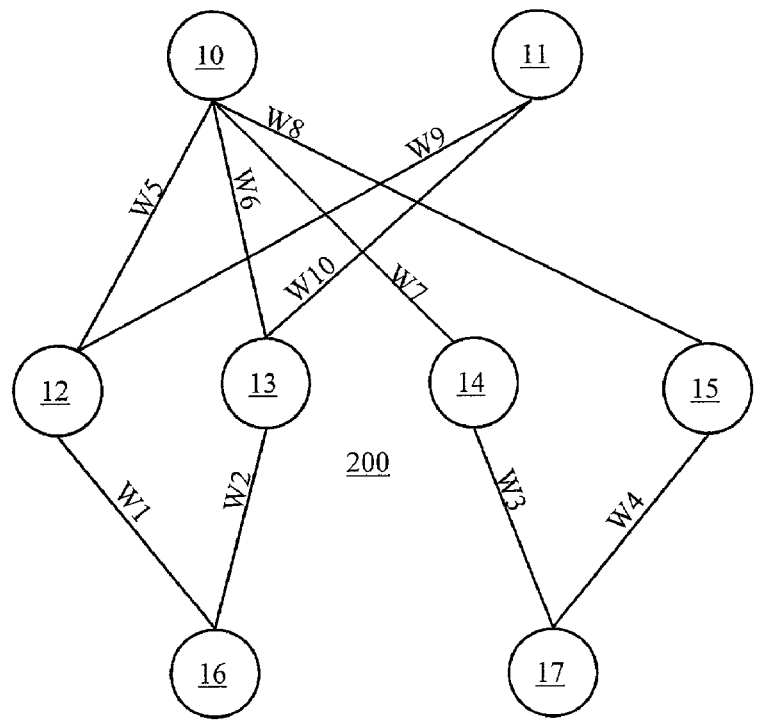
FIG. 3 shows one example of a graph structure which includes an arrangement of nodes and interconnecting arcs with associated weights.

FIG. 3 shows one example of a graph structure 200 which includes an arrangement of nodes 10–17 and interconnecting arcs which are referred to by their associated weights W1–W10. In one embodiment, the graph structure 200 represents a neural network.

The example graph structure 200 includes a substructure of the arcs W1, W2, W5, and W6 and a substructure of the arcs W1, W2, W9, and W10 and a substructure of the arcs W3, W4, W7 and W8. A prior art breadth-first ordering of the weights W1–W10 of the graph structure 200 would result in the following sequence of genetic material in a genome representation.

| W5 | W6 | W7 | W8 | W9 | W10 | W1 | W2 | W3 | W4 |
|----|----|----|----|----|-----|----|----|----|----|

This genome representation yielded by prior art techniques would break up the sequence of genetic material for the substructure of the arcs W1, W2, W5, and W6 when cross-over is applied between the first locus and the eighth locus. Similarly, the above genome representation yielded by prior art techniques would break up the sequence of genetic material for the substructure of the arcs W3, W4, W7 and W8 when cross-over is applied between the third locus and the tenth locus.

The breakup of this genetic material prevents possibly fit solutions for the substructure of the arcs W1, W2, W5, and W6 and for the substructure of the arcs W3, W4, W7 and W8 from being passed on to a next generation of organisms during evolution. Such a failure to pass on fit solutions can increase the time and cost associated with evolving the graph structure 200.

According to the present techniques, a genome representation is determined at step 102 by multiplying a connection matrix element-by-element with a weight matrix to yield a product matrix. At step 102, a score is generated by summing the elements of the product matrix. A minimum value for the score is determined at step 102 by exchanging and the rows and columns of the connection matrix while re-computing the score until a minimum value is obtained. The connection matrix that yields the minimum score provides the genome representation to be used at step 104.

The connection matrix is generated such that each row represents a node and each column represents an arc, initially in some order. The value of an element in the connection matrix is one if the node represented by the row and the column represented by the arc are connected and is zero otherwise.

The weight matrix is of the same size as the connection matrix. Each element(i,j) of the weight is given by the following equation:

$$element(i,j) = |D*i - N*j|$$

where D is the total number of columns, i.e. arcs, and N is the total number of rows, i.e. nodes. The value of an element of the weight matrix indicates an amount by which the element is "off diagonal." For example, if the number of rows is four and the number of columns is four, the weight matrix is as follows.

| 0  | 4 | 8 | 12 |
|----|---|---|----|
| 4  | 0 | 4 | 8  |
| 8  | 4 | 0 | 4  |
| 12 | 8 | 4 | 0  |

Each cell of the weight matrix directly encodes the distance off the diagonal multiplied by the number of rows which is an immaterial constant factor. If the number of rows is three and the number of columns is five, the weight matrix is as follows.

| 0  | 3 | 6 | 9 | 12 |
|----|---|---|---|----|
| 2  | 2 | 1 | 4 | 7  |
| 10 | 7 | 4 | 1 | 5  |

The elements of the product matrix when summed equal a score which is lower when arcs that share nodes are closer together according to the linear ordering given by the row indices. The product matrix is iteratively generated by exchanging rows with other rows and columns with other columns so long as the score continues to diminish. In one embodiment, the score is determined for all exchanges of the first row with the other rows. This yields a locally optimal position for the weight referenced by the first row. The score is then determined for all exchanges of the second row with the other rows to yield a locally optimal position for the weight referenced by the second row, and so on. Thereafter, the score is determined for all exchanges of the first column with the other columns, then for all exchanges of the second column with the other columns, and so on. The product matrix having the lowest score yields an optimal arrangement of weights according to a metric which indicates proximity or compactness of weights associated with the same substructure.

For the example graph structure 200 having 8 nodes and 10 arcs, the weight matrix is a follows.

| 0  | 8  | 16 | 24 | 32 | 40 | 48 | 56 | 64 | 72 |
|----|----|----|----|----|----|----|----|----|----|
| 10 | 2  | 6  | 14 | 22 | 30 | 38 | 46 | 54 | 62 |
| 20 | 12 | 4  | 4  | 12 | 20 | 28 | 36 | 44 | 52 |
| 30 | 22 | 14 | 6  | 2  | 10 | 18 | 26 | 34 | 42 |
| 40 | 32 | 24 | 16 | 8  | 0  | 8  | 16 | 24 | 32 |
| 50 | 42 | 34 | 26 | 18 | 10 | 2  | 6  | 14 | 22 |
| 60 | 52 | 44 | 36 | 28 | 20 | 12 | 4  | 4  | 12 |
| 70 | 62 | 54 | 46 | 38 | 30 | 22 | 14 | 6  | 2  |

For the breadth-first ordering of the weights W1–W10 given by the sequence W5 W6 W7 W8 W9 W10 W1 W2 W3 W4, the connection matrix is as follows where N10–N17 refer to nodes 10–17, respectively.

|     | W5 | W6 | W7 | W8 | W9 | W10 | W1 | W2 | W3 | W4 |
|-----|----|----|----|----|----|-----|----|----|----|----|
| N10 | 1  | 1  | 1  | 1  | 0  | 0   | 0  | 0  | 0  | 0  |
| N11 | 0  | 0  | 0  | 0  | 1  | 1   | 0  | 0  | 0  | 0  |
| N12 | 1  | 0  | 0  | 0  | 1  | 0   | 1  | 0  | 0  | 0  |
| N13 | 0  | 1  | 0  | 0  | 0  | 1   | 0  | 1  | 0  | 0  |

-continued

|     | W5 | W6 | W7 | W8 | W9 | W10 | W1 | W2 | W3 | W4 |
|-----|----|----|----|----|----|-----|----|----|----|----|
| N14 | 0  | 0  | 1  | 0  | 0  | 0   | 0  | 0  | 1  | 0  |
| N15 | 0  | 0  | 0  | 1  | 0  | 0   | 0  | 0  | 0  | 1  |
| N16 | 0  | 0  | 0  | 0  | 0  | 0   | 1  | 1  | 0  | 0  |
| N17 | 0  | 0  | 0  | 0  | 0  | 0   | 0  | 0  | 1  | 1  |

This yields the following product matrix.

|     | W5 | W6 | W7 | W8 | W9 | W10 | W1 | W2 | W3 | W4 |
|-----|----|----|----|----|----|-----|----|----|----|----|
| N10 | 0  | 8  | 16 | 24 | 0  | 0   | 0  | 0  | 0  | 0  |
| N11 | 0  | 0  | 0  | 0  | 22 | 30  | 0  | 0  | 0  | 0  |
| N12 | 20 | 0  | 0  | 0  | 12 | 0   | 28 | 0  | 0  | 0  |
| N13 | 0  | 22 | 0  | 0  | 0  | 10  | 0  | 26 | 0  | 0  |
| N14 | 0  | 0  | 24 | 0  | 0  | 0   | 0  | 0  | 24 | 0  |
| N15 | 0  | 0  | 0  | 26 | 0  | 0   | 0  | 0  | 0  | 22 |
| N16 | 0  | 0  | 0  | 0  | 0  | 0   | 12 | 4  | 0  | 0  |
| N17 | 0  | 0  | 0  | 0  | 0  | 0   | 0  | 0  | 6  | 2  |

The score for this product matrix is 338.

The product matrix having the lowest score in this example is as follows.

|     | W5 | W1 | W2 | W6 | W7 | W3 | W8 | W4 | W9 | W10 |
|-----|----|----|----|----|----|----|----|----|----|-----|
| N12 | 0  | 8  | 0  | 0  | 0  | 0  | 0  | 0  | 64 | 0   |
| N16 | 0  | 2  | 6  | 0  | 0  | 0  | 0  | 0  | 0  | 0   |
| N13 | 0  | 0  | 4  | 0  | 12 | 0  | 0  | 0  | 0  | 52  |
| N10 | 30 | 0  | 0  | 6  | 2  | 0  | 18 | 0  | 0  | 0   |
| N14 | 0  | 0  | 0  | 0  | 8  | 0  | 0  | 0  | 0  | 0   |
| N17 | 0  | 0  | 0  | 0  | 0  | 10 | 0  | 6  | 0  | 0   |
| N15 | 0  | 0  | 0  | 0  | 0  | 0  | 12 | 4  | 0  | 0   |
| N11 | 0  | 0  | 0  | 0  | 0  | 0  | 0  | 0  | 2  | 1   |

This product matrix yields a score of 247. The connection matrix that corresponds this product matrix having the lowest score is as follows.

|     | W5 | W1 | W2 | W6 | W7 | W3 | W8 | W4 | W9 | W10 |
|-----|----|----|----|----|----|----|----|----|----|-----|
| N12 | 1  | 1  | 0  | 0  | 0  | 0  | 0  | 0  | 1  | 0   |
| N16 | 0  | 1  | 1  | 0  | 0  | 0  | 0  | 0  | 0  | 0   |
| N13 | 0  | 0  | 1  | 0  | 1  | 0  | 0  | 0  | 0  | 1   |
| N10 | 1  | 0  | 0  | 1  | 1  | 0  | 1  | 0  | 0  | 0   |
| N14 | 0  | 0  | 0  | 0  | 1  | 1  | 0  | 0  | 0  | 0   |
| N17 | 0  | 0  | 0  | 0  | 0  | 1  | 0  | 1  | 0  | 0   |
| N15 | 0  | 0  | 0  | 0  | 0  | 0  | 1  | 1  | 0  | 0   |
| N11 | 0  | 0  | 0  | 0  | 0  | 0  | 0  | 0  | 1  | 1   |

These product and connection matrices yield the following sequence of genetic material in an optimized genome representation according to the present teachings.

| W5 | W1 | W2 | W6 | W7 | W3 | W8 | W4 | W9 | W10 |
|----|----|----|----|----|----|----|----|----|-----|

This linear sequence of weights provided by the optimized genome representation is translated into a data structure representing the graph structure 200 in several ways. For example, the internal representation of the graph data structure contains the appropriate index into the genome representation either directly or through a table indexed by an inherent link index. Whenever a weight is needed, this index is used to extract the correct number from the genome representation. In another example, a table maps the index in genome-order to the intrinsic index in the graph data structure. Before the graph structure is evaluated, this table is traversed and the weights from the genome are patched into the data structure.

In an alternative embodiment, the connection matrix is a square matrix whose rows and columns both represent arcs and whose elements hold a one if and only if the corresponding two arcs share a node in common. The corresponding weight matrix represents the true distance off the main diagonal. In this embodiment, the rows and columns are swapped at the same time, i.e. when swapping rows i and j columns i and j are also swapped, when finding the optimal score.

A variety of hardware systems including general purpose computer systems and specialized systems are employed to automatically design a desired structure by deriving a genome representation according to the present teachings. The present techniques decrease the computational time on the hardware system employed to automatically determine the genome representation and automatically evolve the weights.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A computer employed method for evolving a graphs structure comprising determining a genome representation for evolving a set of weights for a set of arcs in the graph structure such that the arcs that participate in a substructure of the graph structure are in a close proximity in the genome representation.

2. The method of claim 1, further comprising evolving the weights using the genome representation.

3. The method of claim 1, wherein determining a genome representation comprises determining a matrix which indicates an optimal arrangement of the weights in the genome representation in response to the interconnections among a set of nodes and the arcs of the graph structure.

4. The method of claim 3, wherein determining a matrix comprises:
   determining a connection matrix which indicates interconnections among the nodes and the arcs;
   determining a weight matrix which indicates an amount by which each element of the weight matrix is off a diagonal; and
   determining a product matrix of the connection matrix and the weight matrix.

5. The method of claim 4, wherein determining a matrix further comprises determining a score by summing a set of elements of the product matrix.

6. The method of claim 5, further comprising minimizing the score by swapping one or more rows and columns of the matrix.

7. The method of claim 1, wherein the graph structure is a neural network.

8. A computer employed method, comprising:
   deriving a genome representation for evolving a set of weights in a graph structure by:
   determining a substructure of the graph structure; and
   determining an arrangement in the genome representation such that the weights that participate in the substructure are in a close proximity in the genome representation.

9. The method of claim 8, wherein determining an arrangement comprises determining a matrix which indicates an optimal arrangement of the weights in the genome representation in response to the interconnections among a set of nodes and the arcs of the graph structure.

10. The method of claim 9, wherein determining a matrix comprises:
    determining a connection matrix which indicates interconnections among the nodes and the arcs;
    determining a weight matrix which indicates an amount by which each element of the weight matrix is off a diagonal; and
    determining a product matrix of the connection matrix and the weight matrix.

11. The method of claim 10, wherein determining a matrix further comprises determining a score by summing a set of elements of the product matrix.

12. The method of claim 11, further comprising minimizing score by swapping one or more rows and columns of the matrix.

13. The method of claim 8, wherein the graph structure is a neural network.

14. A computer-readable storage media that holds a program that when executed evolves a graph structure by determining a genome representation for evolving a set of weights for a set of arcs in the graph structure such that the arcs that participate in a substructure of the graph structure are in a close proximity in the genome representation.

15. The computer-readable storage media of claim 14, wherein determining a genome representation comprises determining a matrix which indicates an optimal arrangement of the weights in the genome representation in response to the interconnections among a set of nodes and the arcs of the graph structure.

16. The computer-readable storage media of claim 15, wherein determining a matrix comprises:
    determining a connection matrix which indicates interconnections among the nodes and the arcs;
    determining a weight matrix which indicates an amount by which each element of the weight matrix is off a diagonal; and
    determining a product matrix of the connection matrix and the weight matrix.

17. The computer-readable storage media of claim 16, wherein determining a matrix further comprises determining a score by summing a set of elements of the product matrix.

18. The computer-readable storage media of claim 17, further comprising minimizing the score by swapping one or more rows and columns of the matrix.

19. The computer-readable storage media of claim 14, wherein the graph structure is a neural network.

20. A computer-readable storage media that holds a program that when executed derives a genome representation for evolving a set of weights in a graph structure by:
    determining a substructure of the graph structure; and
    determining an arrangement in the genome representation such that the weights that participate in the substructure are in a close proximity in the genome representation.

21. The computer-readable storage media of claim 20, wherein determining an arrangement comprises determining a matrix which indicates an optimal arrangement of the weights in the genome representation in response to the interconnections among a set of nodes and the arcs of the graph structure.

22. The computer-readable storage media of claim 21, wherein determining a matrix comprises:
    determining a connection matrix which indicates interconnections among the nodes and the arcs;

determining a weight matrix which indicates an amount by which each element of the weight matrix is off a diagonal; and determining a product matrix of the connection matrix and the weight matrix.

23. The computer-readable storage media of claim 22, wherein determining a matrix further comprises determining a score by summing a set of elements of the product matrix.

24. The computer-readable storage media of claim 23, further comprising minimizing score by swapping one or more rows and columns of the matrix.

25. The computer-readable storage media of claim 20, wherein the graph structure is a neural network.

26. A computer employed method for designing a neural network, comprising:

determining a genome representation for a set of weights for a graph structure representing the neural network such that a set of arcs of the graph structure that participate in a substructure of the graph structure are in a close proximity in the genome representation; and evolving the weights using the genome representation.

27. The method of claim 26, wherein determining a genome representation comprises determining a matrix which indicates an optimal arrangement of the weights in the genome representation in response to the interconnections among a set of nodes and the arcs of the graph structure.

28. The method of claim 27, wherein determining a matrix comprises:

determining a connection matrix which indicates interconnections among the nodes and the arcs;

determining a weight matrix which indicates an amount by which each element of the weight matrix is off a diagonal; and determining a product matrix of the connection matrix and the weight matrix.

29. The method of claim 28, wherein determining a matrix further comprises determining a score by summing a set of elements of the product matrix.

30. The method of claim 29, further comprising minimizing the score by swapping one or more rows and columns of the matrix.

* * * * *